United States Patent Office

3,483,242
Patented Dec. 9, 1969

3,483,242
PROCESS FOR THE PREPARATION OF ISOCYANATES
Arthur M. Brownstein, Morristown, and John P. Sibilia, Livingston, N.J., assignors to Allied Chemical Corporation, New York, N.Y., a corporation of New York
No Drawing. Filed Nov. 14, 1966, Ser. No. 593,669
Int. Cl. C07c *119/04, 103/22, 87/50*
U.S. Cl. 260—453    5 Claims

ABSTRACT OF THE DISCLOSURE

Monofunctional isocyanates are prepared by a process which comprises decomposing by heating an N-haloamide having the formula $$R-\overset{O}{\overset{\|}{C}}NHX$$

wherein R is a saturated aliphatic or alicyclic or mononuclear aromatic hydrocarbon radical of up to 20 carbon atoms and X is chlorine, bromine or iodine, in a moving inert gas stream at a temperature from the melting point of said N-haloamide up to about 400° C. and recovering the isocyanate decomposition product.

BACKGROUND OF THE INVENTION

This invention relates to a process for the preparation of isocyanates. More particularly, this invention relates to a process for the preparation of monofunctional isocyanates by the thermal decomposition of N-haloamides.

It is known that isocyanates may be prepared by heating alcoholic solutions of N-haloamides. This reaction is commonly called the Hofmann Rearrangement. However, the recovery of the isocyanate decomposition product has not been considered feasible since isocyanates react rapidly with water and with alcohols to form amines and amides respectively. In addition, isocyanates react even more readily with the N-haloamide starting material to form haloacyl ureas. These undesirable reactions may be illustrated by the following equations:

Hofmann Rearrangement $$R\overset{O}{\overset{\|}{C}}NHX \xrightarrow{\Delta} RNCO + HX$$

Undesirable Side Reactions $$RNCO + H_2O \longrightarrow RNH_2 + CO_2\uparrow$$
$$RNCO + ROH \longrightarrow RNHCOOR'$$

$$RNCO + R\overset{O}{\overset{\|}{C}}NHX \longrightarrow R\overset{O}{\overset{\|}{C}}\overset{O}{\overset{\|}{N}}CNHR$$
$$\phantom{RNCO + RCNHX \longrightarrow RCN}\underset{X}{|}$$

wherein R and R' represent a substituent selected from the group comprising aliphatic hydrocarbons containing from 1 to 20 carbon atoms, alicyclic hydrocarbons containing from 3 to 20 carbon atoms, and mononuclear aromatic hydrocarbons containing from 6 to 20 carbon atoms and X is chlorine, bromine or iodine.

These undesirable side reaction lower the yield of isocyanates obtainable to such a great extent that processes for the preparation of isocyanates based on the Hofmann Rearrangement have not heretofore been considered practical. When, however, the reaction is carried out in accordance with our invention in a moving inert gas stream, good yields of isocyanate may be recovered.

It is a primary objective of this invention to provide a novel and more efficient process for the preparation of isocyanates.

It is another object of this invention to provide a process for the preparation of aromatic, alicyclic and aliphatic isocyanates from readily available, inexpensive starting materials. The term "aromatic" as used herein contemplates aryl, alkaryl, and aralkyl radicals.

These and other objects are accomplished according to our invention wherein monofunctional aliphatic, alicyclic and aromatic N-haloamides are decomposed to isocyanates by heating them in a rapidly moving inert gas stream at a temperature from the melting point of the N-haloamide up to about 400° C. The term "rapidly moving" as hereinafter used connotes a gas velocity of 25 to 1000 cm./min. The inert gas stream serves the essential functions of diluting the starting materials and products of decomposition so that they do not interreact and of transporting them in vaporous form to the point of recovery. The isocyanate product can be recovered by cooling the vapor stream below the boiling point of the isocyanate and collecting the condensed isocyanate in a suitable trap.

The N-haloamides utilized in the process of our invention have the formula $$R\overset{O}{\overset{\|}{C}}-NHX$$

wherein R is a member selected from the group comprising aliphatic aryl, alicyclic, aralkyl and alkaryl radicals, and X is halogen selected from the group consisting of chlorine, bromine and iodine. Substituents which will not interfere with the reaction such as nitrile, alkoxy, halogen, nitro or sulfide can replace one or more of the hydrogen atoms on radical R. Amides which are suitable for preparing the starting materials of our process include acetamide, propionamide, butyramide, valeramide, caproamide, heptamide, caprylamide, pelargonamide, capramide, lauramide, myristamide, palmitamide, stearamide, arachidamide, cyclohexane carboxamide, benzamide, o-, m- and p-toluamide, o-, m- and p-ethyl, propyl and butyl benzamide, o-, m- and p-nitro, methoxy, ethoxy and chlorobenzamide, dichlorobenzamide, phenylacetamide and phenylpropionamide.

These N-haloamides may be prepared by suitable methods known in the art such as by halogenation of the corresponding amide. For example, chloro-substituted amides can be prepared by passing gaseous chlorine through a slurry of an amide in dilute hydrochloric acid, as disclosed by G. R. Elliott in J. Chem. Soc., 121, 202 (1922). The resultant N-chloroamide precipitates and can be collected and purified in any convenient manner. Bromo-substituted amides can be prepared according to the process disclosed by C. R. Hauser and W. B. Renfrow, Jr., J. Am. Chem. Soc., 59, 121 (1937) whereby an amide is shaken with cold sodium hypobromite solution and precipitated by pouring into cold dilute acetic acid.

In carrying out the process of our invention, it is necessary that decomposition of the N-haloamide be carried out in a rapidly moving inert gas stream. Suitable inert gases include, for example, nitrogen, helium, argon, carbon dioxide and the like. Preferably, the gas should be dry and preheated to the desired temperature of decomposition. The gas serves as diluent for the products of decomposition so lowering their concentration that it prevents reaction between the isocyanate and the starting material. Moreover, the diluent gas acts as a carrier for the isocyanate product advantageously conducting it to the collection point. The vapor stream can be cooled below the boiling point of the isocyanate and other products which can be separately collected in a suitable trap. The vapor stream can then be scrubbed and dried and recirculated to the decomposition chamber, if desired.

N-haloamides are decomposed according to our invention by heating them to a temperature of at least about the melting point of the particular haloamide. While temperatures up to about 400° C. may be used, we have found that the yield in most cases tends to decrease substantially with temperatures greater than about 300° C. Accordingly, a temperature from about 100° C. to about 300° C. is preferred in our process. Only a short time is required for decomposition to be effected and heating is usually continued only for that period required (i.e., to produce decomposition) for the maximum yield of isocyanate.

The N-haloamides may be decomposed neat; however, the yield of isocyanate is frequently improved if the N-haloamide is decomposed in solution in an inert aprotic solvent. Preferably, therefore, the N-haloamide is decomposed in solution. Suitable solvents for the N-haloamide include nitroalkanes, nitroaromatics, aromatic hydrocarbons, tertiary amides, halogenated hydrocarbons, glycol ethers, and the like, for example, nitromethane, nitroethane, nitrobenzene, toluene, xylene, cumene, dimethylformamide, dimethylacetamide, methylene chloride, chloroform, carbon tetrachloride, diglyme and diethylcarbitol. The solvent is preferably volatile at the temperature of decomposition and readily separable from the products of decomposition.

A catalyst is not required in our process and good yields of isocyanate have been obtained without the use of a catalyst. In some cases, however, the use of a catalyst may be beneficial in improving the yield of isocyanate. For this purpose an inorganic base may advantageously be employed as catalyst. Suitable illustrative examples of appropriate catalysts are sodium hydroxide, calcium oxide, sodium carbonate, alumina, and the like. It will be understood that, when employed, the requirements of solvent and catalyst for each N-haloamide which will produce the highest yields of its corresponding isocyanate can be determined by test runs.

The following specific examples further illustrate our invention.

Example 1.—Decomposition of N-chlorobenzamide

A saturated solution of N-chlorobenzamide in nitrobenzene was charged to the injection port of a vapor phase chromatographic column of ¼-inch copper tubing 15 feet long packed with 22.5% by weight of SE-30 silicone oil on Chromosorb P firebrick. A gas flow of 85 cc./min. of helium was maintained through the column. The temperature at the injection port was 230° C. An 18% yield of phenyl isocyanate was obtained as determined by vapor phase chromatographic analysis using benzophenone as an internal standard.

The decomposition was repeated at various other injection port temperatures. The effect of varying the port temperature is shown below:

Temperature, ° C. of injection port: | Yield phenyl isocyanate, percent
--- | ---
150 | 12
230 | 18
300 | 12
400 | 2

Example 2.—Effect of catalyst on yield of phenyl isocyanate

The effect of various basic catalysts on the decomposition of N-chlorobenzamide at 230° C. as carried out in Example 1 was determined as tabulated below, wherein parts catalyst are by weight for one part by weight of chlorobenzamide.

| Catalyst: | Parts catalyst | Yield phenyl isocyanate, percent |
| --- | --- | --- |
| Sodium hydroxide | 0.945 | 5.31 |
| Calcium oxide | 1.10 | 9.21 |
| Alumina | 1.22 | 10.7 |
| Sodium carbonate | 0.94 | 29.6 |
| None | 0.0 | 13.0 |

This examples serves to illustrate that in some instances a basic catalyst may be advantageously employed.

Example 3.—Effect of heating time on yield of phenyl isocyanate

The effect of heating time was studied in a series of experiments summarized below. Little advantage was found by prolonging the heating time. The decompositions were performed on N-chlorobenzamide as a saturated solution in nitrobenzene at 230° C. and were carried out as in Example 1.

Heat time, sec.: | Yield, phenyl isocyanate, percent
--- | ---
1 | 18
60 | 21
300 | 21

Example 4.—Effect of solvent on yield of phenyl isocyanate

The effect of solvent is substantial, as can be seen from the series of experiments summarized below. Saturated solution of N-chlorobenzamide were decomposed at 230° C. as in Example 1.

Solvent: | Yield phenyl isocyanate, percent
--- | ---
Pyridine | 3
Dimethylformamide | 5
Methanol | 4.9
Nitrobenzene | 20.0
Chloroform | 39.9

Example 5.—Decomposition of N-chlorophenyl acetamide

Phenylacetyl chloride was ammoniated by cold aqueous ammonia. The resulting amide was then chlorinated in 3 N HCl and recrystallized from chloroform affording N-chlorophenyl acetamide melting point 125–127° C., soluble in aqueous base. The structure was confirmed by elemental analysis.

Decomposition at 230° C. carried out as in Example 1 afforded benzyl isocyanate in 8.6% yield. This example serves to illustrated the applicability of our process to the preparation of aralkyl isocyanates.

Example 6

N-bromoacetamide was dissolved in dimethylformamide and decomposed at 230° C. as in Example 1. Methyl isocyanate was recovered. The infrared spectrum exhibits strong absorption bands at 3000 and 2300 cm.$^{-1}$. This example illustrates the applicability of our process to the preparation of aliphatic isocyanates.

Example 7.—Preparation of p-methoxyphenyl isocyanate 1.0 mol of anisoylchloride (p-methoxybenzoylchloride) is reacted with concentrated aqueous ammonia to afford the corresponding amide. Reaction with aqueous sodium hypobromite solution affords a 61% yield of N-bromo-p-methoxybenzamide. Decomposition of a saturated solution of this compound in dimethylformamide at 230° by the procedure of Example 1 affords a 17% yield of p-methoxyphenyl isocyanate. The product exhibits a strong isocyanate absorption band at 2300 cm.$^{-1}$ and other strong bands at 830 cm.$^{-1}$ and 1270 cm.$^{-1}$.

Example 8.—Preparation of cyclohexyl isocyanate 1.0 mol of cyclohexane carboxylic acid is added dropwise to 500 cc. of refluxing thionyl chloride. After addition is complete, the refluxing is continued for an additional two hours. The reaction mixture is distilled to a head temperature of 85° C. and the distillation residue added to 1 liter of concentrated aqueous ammonia without further purification. Cyclohexane carboxamide precipitates out and is collected by suction filtration. Treatment with aqueous sodium hypobromite as in Example 7 affords a 70% yield of N-bromocyclohexane carboxamide. A portion of this material is dissolved in methylene chloride and decomposed at 230° C., according to the procedure of Example 1, affording a 30% yield of cyclohexyl isocyanate.

This example illustrates the applicability of our process to the preparation of alicyclic isocyanates.

We claim:

1. A process for the preparation of monofunctional isocyanates which comprises decomposing by heating neat or in an aprotic solvent an N-haloamide having the formula

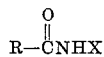

wherein R is a saturated aliphatic or alicyclic or mononuclear aromatic hydrocarbon radical of up to 20 carbon atoms and X is chlorine, bromine or iodine in a moving inert gas stream at a temperature from the melting point of said N-haloamide up to about 400° C. and recovering the isocyanate decomposition product.

2. A process according to claim 1 wherein the temperature is from about 150° C. up to about 300° C.

3. A process according to claim 1 wherein said N-haloamide is dissolved in an inert aprotic solvent.

4. A process according to claim 1 wherein said N-haloamide is N-chlorobenzamide.

5. A process according to claim 3 wherein said N-haloamide is N-chlorobenzamide and said aprotic solvent is chloroform.

References Cited

UNITED STATES PATENTS

| 2,326,501 | 8/1943 | Siefken et al. | 260—453 |
| 2,773,086 | 12/1956 | Slocombe et al. | 260—453 |
| 3,118,925 | 1/1964 | Mukaiyama et al. | 260—453 |

OTHER REFERENCES

Mauquin: Chemical Abstracts, vol. 4, pages 583–4 (1910).

Hauser et al.: J. Am. Chem. Soc., vol. 59, pages 121–5 (1937).

CHARLES B. PARKER, Primary Examiner

D. H. TORRENCE, Assistant Examiner

U.S. Cl. X.R.

260—404, 465, 465.4, 471, 482, 553, 557, 558, 559, 561, 578, 583, 699